Aug. 30, 1966  E. P. BULLARD III  3,269,013
PROGRAM CONTROL

Filed May 11, 1964  4 Sheets-Sheet 1

INVENTOR.
EDWARD P. BULLARD III
BY
ATTORNEY

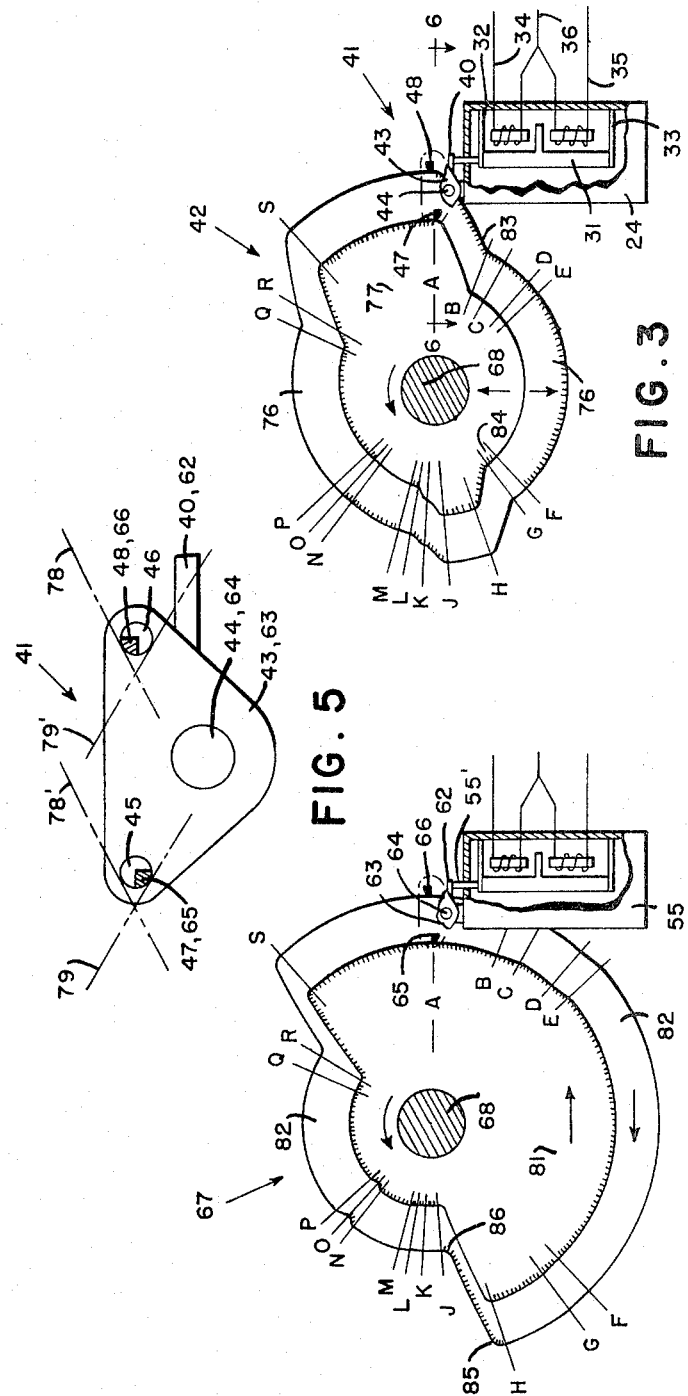

Aug. 30, 1966    E. P. BULLARD III    3,269,013
PROGRAM CONTROL
Filed May 11, 1964    4 Sheets-Sheet 4

INVENTOR.
EDWARD P. BULLARD III
BY
ATTORNEY.

United States Patent Office 3,269,013
Patented August 30, 1966

3,269,013
PROGRAM CONTROL
Edward P. Bullard III, Fairfield, Conn., assignor to The Bullard Company, Bridgeport, Conn., a corporation of Connecticut
Filed May 11, 1964, Ser. No. 366,454
13 Claims. (Cl. 33—18)

This invention relates to machine tools, and particularly to an improved program control for causing one or more tools to be moved through a cycle of operations in performing work.

This application includes subject matter related to that shown, described and claimed in application Serial No. 354,361, filed March 25, 1964, in the name of Edward P. Bullard, III.

There are prior art devices in which a member is moved along intersecting axes by a separate cam for each axis, which cams are rotated as a unit to cause the member to be moved through a cycle of operations. These devices, however, employ a rigid linkage between the movable member and the cam follower so that the power required to move the movable member and the accuracy of its movement are both developed by the cam itself. Furthermore, the maximum angle or slope of the contour on the cam edge cannot exceed 45° without the forces becoming excessive. This, therefore, requires an excessively large diameter cam for any reasonable cycle of operations, and if it is kept small by using multiplying linkage between it and the movable member, the resulting error is correspondingly increased.

In such prior known devices, peripheral, open-edge cams are employed. This requires a force always acting to maintain the follower on the cam periphery, which force must be in excess of required material cutting force so that cutting can occur with the member moving in one direction, i.e., with the cam follower moving toward the axis of rotation of the cam. This, therefore, requires the cam to effect at least twice as much force to produce a cut with the member moving in the opposite direction.

Various template arrangements have heretofore been provided for causing tools to follow predetermined paths of travel in machining work. Thus, contouring in the machine tool field often involved a stylus following a template having a desired contour to control the movement of a tool holder to machine a workpiece to the desired shape. The design of available tracer heads, for two-dimensional contouring, for example, comprises two inductive bridges which are positioned mechanically 90 degrees relative to each other. When the stylus is undeflected (in a null position), both bridges are balanced and there is no output from the tracer head. Upon deflecting the stylus from its null position, each bridge produces an A.C. signal which is proportional to the magnitude of the deflection along the corresponding mechanical axis. As the deflection passes through zero and is reversed, the phase of the signal reverses. Thus, the output of each bridge is an indication of the direction and magnitude of the component of deflection along the corresponding mechanical axis.

There is, however, a circular area about the null position of the stylus that is a "dead band," and deflections of the stylus must exceed the radius of this area to render the control effective. This area provides an inherent source of error that reflects in the work being produced since the deflection of the stylus by the template will vary in accordance with many factors including friction, surface speed and template shape.

Known program controls of the above described type have limited capabilities in that they cannot produce sharp corner contours, re-entrant angle contours as well as many other contours that are demanded in industry.

The principal object of this invention is to provide a program control for a movable tool support of a machine tool which will have the capability of producing any desired contour on work, regardless of shape.

Another object of the invention is to provide such a control that eliminates the inherent inaccuracies present in prior known tracer control devices.

Still another object of the invention is to provide such a control in which the pressure between a servo-follower and a template surface is independent of the forces required to produce the desired machining, and is of a substantially low value.

A still further object of the invention is to provide such a control in which separate servo means act on separate templates for controlling the movement of the tool slide along separate axes, and in which successive points along the contours of the separate templates effect, through servo and feedback means, the instantaneous displacements of the tool slides along the corresponding axes.

Another object of the invention is to provide such a control in which the templates are locked together and rotated through 360° relative to the servo means to produce a complete cycle of operations. In this way, each succeeding point about the peripheral edges of the locked templates combines the coordinates of each axis corresponding to that point, providing a resultant displacement of the tool slide in accordance with the contour to be produced.

Although the principles of the invention are equally applicable to any number axis system, it will, for clarity, be described in relation to a two-axis system.

In one aspect of the invention, a work holder may be provided for supporting work desired to be machined in accordance with a desired contour. The work support may be rotatable or non-rotatable. A member, stationary relative to the work support, may be located in position such that it can slidingly support a saddle for movement along an axis relative to the work support.

In another aspect of the invention, a tool slide may be mounted on the saddle for linear movement at right angles to the axis of movement of the saddle, and a tool or tools may be mounted on the tool slide for operating on work held by the work support. Accordingly, the tool slide is capable of universal movement within a plane. If the work support is non-rotatable, then the tools may be rotatable and vice versa.

In another aspect of the invention, means may be located between the stationary member and the saddle for reciprocating the latter along its axis of motion. Separate means may be provided between the saddle and tool slide for reciprocating the slide along its axis of movement which is at right angles to the axis of movement of the saddle. These means may take various forms such as a reversible direct current electric motor, a rotary fluid-operated motor, a linear fluid-operated motor, or other suitable means.

In another aspect of the invention, separate servo means may be employed to control the energizing and de-energizing of the motor means, and each servo means may be operated by a separate rotatable template means.

In still another aspect of the invention, the coordinates of the template means for each axis of movement of the universally movable slide are proportional to the corresponding axis coordinates of the desired path of movement of the slide for the contour desired to be produced.

In a still further aspect of the invention, the separate template means are rigidly fixed relative to each other and are rotated through a predetermined angle, usually 360°, in producing the cycle of operations of the tool slide.

In still another aspect of the invention, the servo means may comprise a transducer having means that is always displaced axially by the template means and which involves no lost motion. By way of example only, the transducer may be in the form of an E transformer and equivalents thereof.

In a still further aspect of the invention, there is provided composite template means for each axis of movement of the tool slide in which separate components of each composite template means controls the motion of the tool slide in one direction along the corresponding axis.

The above, other objects and novel features of the invention will become apparent from the following specification and accompanying drawings which are merely exemplary.

In the drawings:

FIG. 3 is an enlarged view of a portion of the machine shown in FIG. 2;

FIG. 4 is an enlarged view of a portion of the apparatus shown in FIG. 2;

FIG. 5 is an enlarged view of a detail of the invention;

FIG. 6 is a sectional plan view taken substantially along line 6—6 of FIG. 3.

Figure 1:
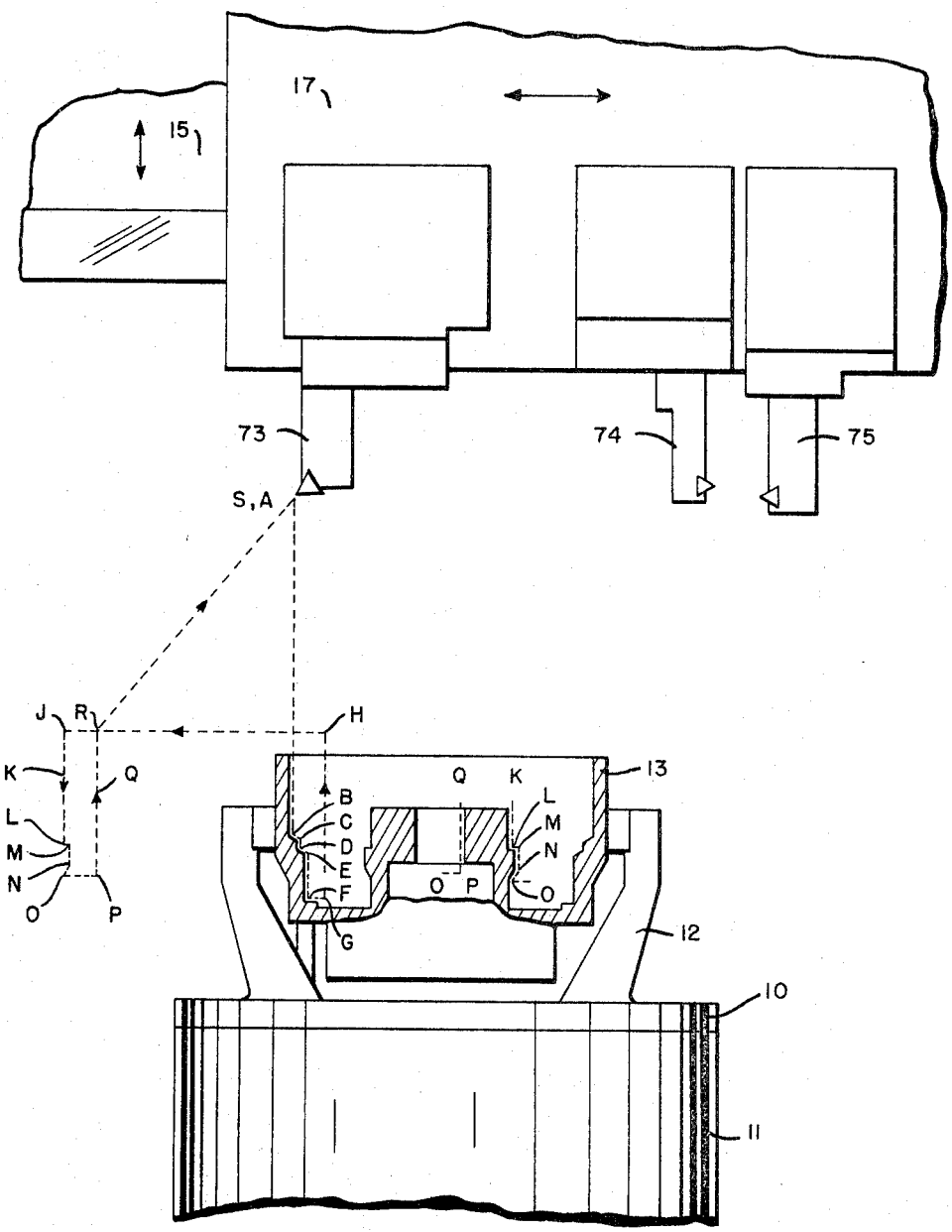
FIG. 1 is a front elevational view of certain parts of a machine tool to which the principles of the invention have been applied.
Figure 2:
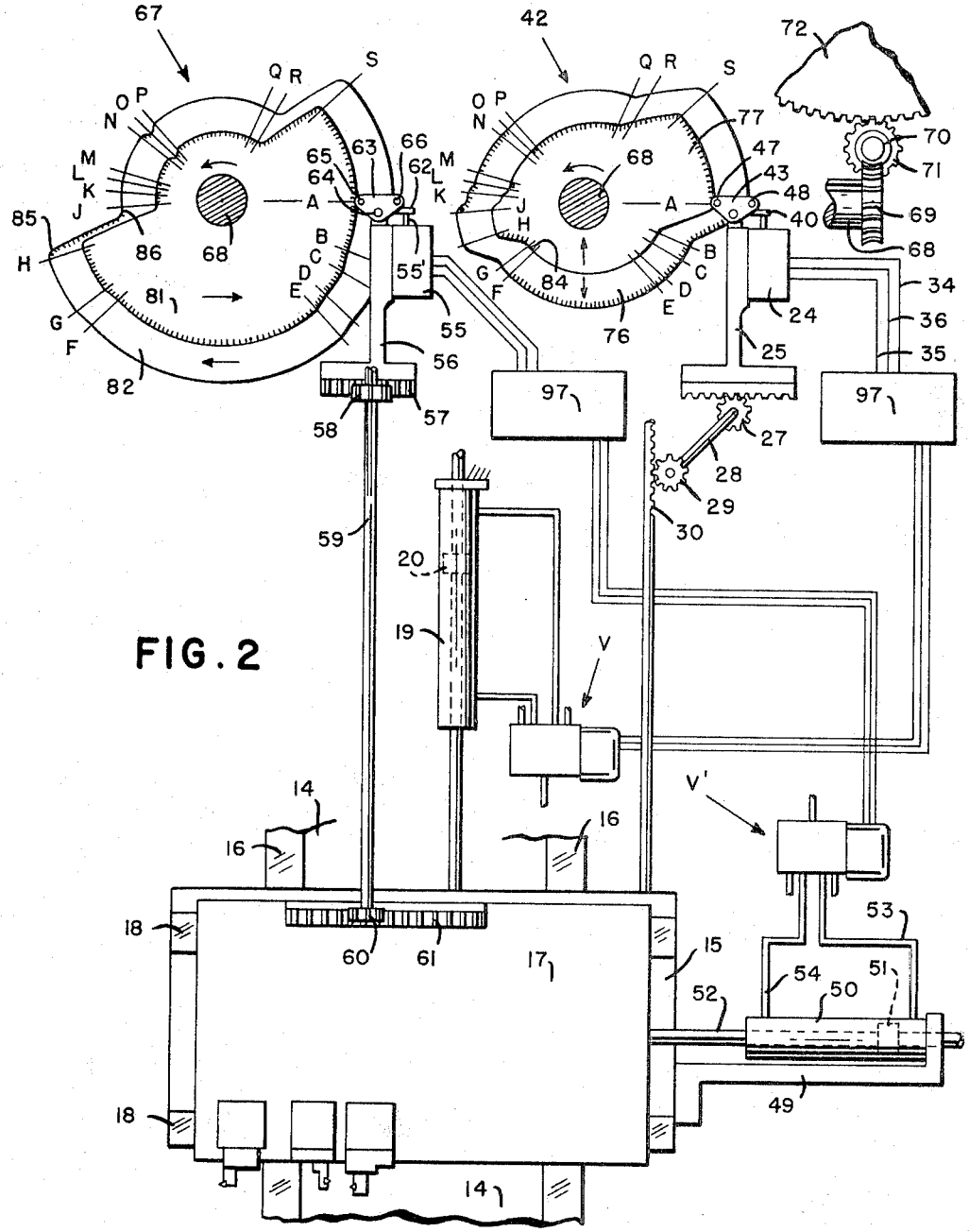
FIG. 2 is a view similar to FIG. 1, showing additional parts of the machine tool to which the principles of the invention have been applied.

Referring to the drawings, and particularly to FIGS. 1 and 2, the principles of the invention are shown as applied to a machine tool including a rotatable work-supporting table 10 (FIG. 1) mounted within a base 11 for rotation by a conventional headstock transmission (not shown). The table 10 may support a work holding fixture 12 within which a workpiece 13 is rigidly mounted and upon which turning and facing operations are to be performed, all in a predetermined cycle of operations.

The base 11 may include a portion 14 extending upwardly behind table 10 (FIG. 2) and it may support a saddle 15 mounted for vertical sliding movement along ways 16 on the machine base portion 14. A tool slide 17 may be mounted for horizontal sliding movement along ways 18 on saddle 15.

Referring to FIG. 2, a cylinder 19, fixed to the portion 14, may have a piston 20 therein, the piston rod 21 of which is connected to saddle 15. Fluid transmission lines 22 and 23 connect the opposite ends of cylinder 19 to a pilot-operated servo valve V. The valve V may be of the type manufactured by the Moog Valve Company, East Aurora, New York. It may employ a flapper nozzle including a flapper having opposed nozzles on each side of it. The flapper is moved by a motor supplied with amplified control power. Movement of the flapper controls the position of the pilot valve to supply or exhaust the lines 22 and 23 leading to opposite ends of the cylinder 19. Such a valve is shown and described in 15–21 of Control Engineers' Handbook by Truxal, published by McGraw-Hill. The amplified power is derived from an E transformer 24 that is mounted on a horizontally reciprocable bracket 25 having a rack 26 thereon that meshes with a gear 27 fixed to one end of a shaft 28. Another gear 29 fixed to shaft 28 meshes with a vertical rack 30 that is fixed to the saddle 15.

The E transformer 24 may include an axially movable armature 31 supported between leaf springs 32 and 33 that are prestressed in a manner to bias the armature 31 upwardly against a lever 40 forming part of a double roll stylus 41 that engages the peripheral surfaces of a template assembly 42, all as will be more fully described later.

The design of the E transformer is such that movement of the armature 31 on each side of a null position produces signals of opposite polarity that are conducted over lines 34, 35 and 36 to an amplifier 37, the output of which controls the motor of the servo valve V. For a general discussion of E transformers, see 17–13, Control Engineers' Handbook by Truxal, supra.

The double roll stylus 41 may include a triangularly shaped plate 43 pivoted at one of its apices 44 on the housing for transformer 24. The other two apices support styluses 45 and 46 which are provided with template engaging quadrant means 47 and 48. Lever 40 is integral with plate 43 and is arranged such that it is at exactly right angles to the longitudinal axis of armature 31 when the armature is in its null position.

From the foregoing it is evident that armature 31 is urged upwardly by springs 32 and 33 and tends to move plate 43 counterclockwise about pivot point 44 until quadrant means 47 and/or 48 contact the peripheral edge of template means 42. At the beginning of a cycle of operations, the peripheral edge of template means 42 will be such as to maintain lever 40 and armature 31 in their null positions. As template means 42 is rotated counterclockwise, any point on its peripheral edge that tends to move away from quadrant means 48 will permit armature 31 to rise, providing the necessary signal which controls valve V to effect the forcing of piston 20 and saddle 15 vertically downwardly. Accordingly, rack 30 moves downwardly, effecting horizontal movement of bracket 25 leftwardly while maintaining quadrant means 48 in contact with template means 42 and forcing lever 40 and armature 31 into their null positions. Thus, rack 30, pinions 27, 29 and horizontally slidable rack 26 provide a feedback means which with E transformer 24 and template means 42 provides a servo control over the vertical movement of saddle 15. Regardless of the forces resisting the movement of saddle 15, the forces between the template means 42 and armature 31 will always be independent thereof and of substantially zero value.

Conversely, action of template means 42 on quadrant means 47 moving it clockwise about pivot 44 will depress armature 31 against the action of spring 39. Movement of armature 31 downwardly effects the forcing of piston 20 and saddle 15 upwardly by the action of valve V. The upward movement of saddle 15 moves E transformer 24 rightwardly through the action of the feedback 30, 29, 27 and 26 until the null position of armature 31 is achieved.

A bracket 49 may be attached to saddle 15 for vertical movement therewith. It may support a cylinder 50 having a piston 51 therein, the rod 52 of which is connected to tool slide 17. Lines 53 and 54 lead respectively from opposite ends of cylinder 50 to another pilot operated servo valve V' identical with servo valve V. Valve V' is controlled by another E transformer 55 mounted on a horizontally reciprocable bracket 56 having a rack 57 that meshes with a pinion 58 splined to a shaft 59. Shaft 59 has a gear 60 fixed to it that meshes with a rack 61 integrally attached to a tool slide 17.

The transformer 55 includes an armature 55' identical with armature 31 of transformer 24 and it is axially moved by a lever 62 forming part of plate 63 that is pivoted at 64 on the housing for transformer 55. Plate 63 includes quadrant means 65 and 66 mounted thereon in a manner similar to the quadrant means 47 and 48 on plate 43. Another template means 67 is provided for actuating plate 63 in the same way that template means 42 actuates plate 43.

Thus, at the beginning of a cycle of operations, the template means 67 maintains the armature 55' of E transformer 55 in its null position. Counterclockwise movement of plate 63 permits armature 55' to move upwardly, causing pressure fluid to flow into the righthand end of cylinder 50 and exhausting the lefthand end, thereby moving piston 51 and tool slide 17 leftwardly. The feedback means 57, 58, 59, 60 and 61 return armature 55' to its null position. Additionally, movement of plate 63 clockwise causes pressure fluid to flow into the lefthand end of cylinder 50 while exhausting the righthand end, thereby moving piston 51 and tool slide 17 rightwardly; and the feedback means above referred to returns armature 55' to null position.

The template means 42 and 67 are fixed to a shaft 68 that is rotated in a counterclockwise direction and has a worm gear 69 fixed thereto that meshes with a worm 70 that is shown as geared through pinion 71 to a large gear 72. The shaft 68 may be journaled in bearings mounted on the portion 14 of base 11.

Referring again to FIG. 1, a workpiece 13 is shown held in the fixture 12. The workpiece is to have its internal surface turned along a bevel from B to C; turned from C to D; another bevel produced from D to E; turned from E to F; faced from F to G; another turning from K to L; a facing from L to M; a turning from M to N; beveled from N to O; and finally turned from P to Q. These operations, in the present embodiment, are to be performed in a cycle by tools 73, 74 and 75, all mounted on the tool slide 17. The horizontal spacing of tools 73, 74 and 75 on slide 17 is dictated by the dimensions of the workpiece 13 and the operations to be performed by each tool. In the embodiment disclosed, tool 73 is employed to produce all surfaces between points A to G, inclusive; tool 75 is used to machine surfaces from K through O; and tool 74 is used only to turn the surface P to Q.

Obviously, tool 74 must be spaced horizontally from tool 73 so that during its cutting operation, tool 74 will clear and ride on the righthand side of fixture 12. Furthermore, tool 75 is spaced horizontally from tool 74 so that when the former is machining surfaces M to N, tool 74 will be to the left of surface P to Q.

The position of the cutting points of tools 73, 74 and 75 vertically downward from the bottom end of slide 17 is determined by the amount of overhang necessary to permit required vertical motion without interference between the workpiece and tool slide and between the workpiece and tool tips.

Initially, the locations of the cutting tips of tools 73, 74 and 75 are laid out from the dimensions of the workpiece and the best path of movement of the tool slide 17 to produce the various machining operations in a programmed cycle. Thus, in the example shown, the path of travel of the tool slide 17 has been determined so that the cutting point of tool 73 follows the path A–B–C–D–E–F–G–H–J–K–L–M–N–O–P–Q–R–A.

The template means 42 is then designed so that its polar coordinates are proportional to corresponding coordinates along the vertical axis of motion of slide 17 to effect the above-referred-to path of movement of tool 73. And, the template means 67 is designed so that its polar coordinates are proportional to corresponding coordinates along the horizontal axis of motion of tool slide 17 to effect said path of movement.

It is felt that the design and construction of the template means 42 and 67 can best be understood by describing the cycle of operations performed on the workpiece 13. Having made the tool layout and a layout of the path of travel of the tool slide 17 as previously explained; it becomes relatively simple to calculate the time required for each motion along said path at a desired rate of feed for the material being machined and at desired traverse rates. A total of these individual times represents the time for the complete cycle and provides the data from which the polar coordinates of the template means can be calculated. Since template means 42 and 67 are fixed relative to each other and are rotated through 360° to complete a program, the distance between each point A. B, C, etc., about the path can be represented by a corresponding distance between corresponding points A, B, C, etc., about the template means 42 and 67. Furthermore, the rate of movement between succeeding points A, B, C, etc., about template means 42 and 67 will be the slope of the effective template surface between said points. Expressed otherwise, it is the rate of change of radial distance between two succeeding points.

The geometry of the plates 43 and 63 and the construction of template means 42 and 67 are of considerable importance in the present invention. The template means 42 and 67 are composite template means, i.e., template means 42 comprises two components that are located in spaced parallel planes. Thus, composite template means 42 includes a template component 76, the peripheral edge of which is aligned and cooperates with the quadrant means 48. It also includes another template component 77, the peripheral edge of which is aligned and cooperates with quadrant means 47. In the embodiment disclosed, the component 76 is employed to control vertically downward movements of the saddle 15 and with it, slide 17, while component 77 is employed to control vertically upward movements of saddle 15 and with it, slide 17 as well as periods of dwell of saddle 15 in its vertical movement, which latter are produced by simply employing arcuate peripheral portions of component 77 having the center of said arcuate portions at the axis of shaft 68.

Referring again to FIG. 5, it is evident that with the composite template means 42 rotating in a counterclockwise direction, downward movement of saddle 15 is controlled by a surface on template component 76, the slope of which is shown as dot-and-dash line 78 (FIG. 5), cooperating with quadrant means 48, and the velocity of movement of saddle 15 will depend upon the slope of line 78. It is to be noted that the slope of line 78 may be any place within the first and third quadrants and any angle between a vertical and a horizontal line, the former providing no downward movement of saddle 15 as template means 42 rotates counterclockwise, and the latter theoretically providing infinite speed. However, any angle less than horizontal would provide a finite rapid rate of movement of saddle 15, and any angle between vertical and horizontal would be effective without interfering with the proper functioning of the plate 43.

Upward movement of saddle 15 is controlled by a surface of template component 77, the slope of which is shown as dot-and-dash line 79, cooperating with quadrant means 47. The velocity of upward movement of saddle 15 will depend upon the slope of line 79, and it may be any place within the second and fourth quadrants and any angle between vertical which is an arcuate line having its center at the axis of shaft 68 and which provides a period of dwell with no upward movement of saddle 15, or it may be horizontal which would again provide a theoretically infinite speed of saddle 15.

In a similar fashion, the template means 67 may comprise a component 81, the peripheral edge of which is aligned and cooperates with quadrant means 65. It also includes another template component 82, the peripheral edge of which is aligned and cooperates with quadrant means 66. The component 81 is employed to control horizontal rightward movement of slide 17 as well as periods of dwell, while the component 82 is employed to control horizontal leftward movement of the slide 17. The quadrant means 65 and 66 on plate 63 cooperate with the slope of the various portions of the template components 81 and 82 in the same manner that the quadrant means 47 and 48 cooperate with template components 76 and 77.

It has been found that the template means may be composed of components of identical contour, one being of a different size than the other by an amount equal to the distance between the two quadrant means 47, 48.

Referring to FIG. 6, the plate 43 is shown as provided with two non-rotatable styluses 45 and 46. By way of explanation, it is to be noted that the quadrant means 48 (FIG. 5) lies in the second quadrant, and the quadrant means 47 lies in the third quadrant. The remainder of the styluses 45, 46 is relieved to provide clearance as will be explained.

Since both components 76 and 77 of the template means 42 have peripheral surfaces of identical contour, the lines 78 and 78' (FIG. 5) represent corresponding portions on 76 and 77 that lie in the first and third quadrants. It is apparent from FIG. 5 that the line 78 is in active position with quadrant means 48, and that line 78' lies within the clearance portion of the stylus 45. This same condition will prevail for all lines 78, 78' between vertical and horizontal so long as they lie within the first and third quadrants.

In a similar fashion, lines 79 and 79' represent corresponding portions on components 76 and 77 that lie in the second and fourth quadrants. It is apparent from FIG. 5 that line 79 is in active position with quadrant means 47 of stylus 45; and that line 79' lies within the clearance portion of stylus 46. This same condition will prevail for all lines 79, 79' between vertical and horizontal so long as they are within the second and fourth quadrants.

The plate 63 corresponding to plate 43 is provided with styluses having quadrant means 65 and 66 similar to means 47 and 48.

Referring to FIG. 2, with the parts in the condition shown, the point on the periphery of template component 76 along the line A acts on quadrant means 48, holding armature 31 in its null position, while quadrant means 47 is ineffective. Template component 81 is acting on quadrant means 65, holding armature 55' in its null position, while quadrant means 66 is ineffective; and the cutting point of tool 73 is at point A (FIG. 1).

As the combined template means 42 and 67 rotate in a counterclockwise direction to point B, the quadrant means 65 follows along a circular surface of template segment 81 having its center at the axis of rotation of shaft 68. Consequently, tool slide 17 is prevented from horizontal motion. However, during this rotation of template means 42, quadrant means 48 follows the surface on template component 76 between points A and B which has a relatively rapid change of slope, providing a rapid traverse movement of saddle 15 vertically downwardly until the cutting point of tool 73 is at point B. In the embodiment disclosed, no cutting occurs until the cutting point of tool 73 reaches point B, at which point a slow feeding operation from B to C (FIG. 1) is effected. In order to provide a transition from rapid traverse to a slow feed rate downwardly, a curved deceleration surface 83 on template component 76 is provided at point B. This curved surface 83 acts to decelerate the traverse motion so that no abrupt disruptive action will occur in changing from a rapid traverse to a slow feed motion.

In moving template means 42, 67 from point B to point C, the rate of change of slope of template component 76 is slight and such as to produce a vertically downward movement of saddle 15. Since the velocity of saddle 15 is determined by this slope, a relatively slow feed rate of movement of saddle 15 occurs. Also, the slope of the template surface from B to C on template component 81 is likewise slight, and such that it acts on quadrant means 65 to move armature 55' downwardly, thereby producing a rightward movement of tool slide 17. The simultaneous action of quadrant means 48 and 65 in the moving of template means 42 and 67 from B to C causes slide 17 simultaneously to move rightwardly and downwardly, producing a resultant motion from B to C on the path of travel of tool 73.

Continued counterclockwise movement of template means 42, 67 between points C and D thereon presents a circular (effective) portion on template component 81 which cooperates with quadrant means 65 and retains the tool slide 17 from horizontal motion, while the portion C to D on template component 76 acts on quadrant means 48 to effect a downward movement of saddle 15 until the cutting point of tool 73 reaches point D, whereupon component 81 acts on quadrant means 63 simultaneously with component 76 acting on quadrant means 46 to produce the beveled surface between points D and E of the path of movement of tool 73.

Template component 81 between its points E to F follows a circular path with its center at the axis of shaft 68, thus preventing horizontal movement of tool slide 17. The portion of component 76 between its points E–F is a curve of progressively diminishing radii, causing armature 31 to move upwardly, thereby causing saddle 15 to move downwardly at a feed rate determined by the rate at which the radii diminish over the extent of the portion E to F of component 76.

Portion F to G on component 77 is circular with its center at the axis of shaft 68. The action of quadrant means 47 on this circular portion prevents saddle 15 from moving vertically. The portion F to G on component 81 is along a line that acts on quadrant means 65, forcing armature 55' downwardly, thereby effecting rightward movement of tool slide 17 until tool 73 is at point G in its path of travel.

From G to H on component 81 the curve is circular with its center on the axis of shaft 68, preventing horizontal movement of tool slide 17. The portion G to H on component 77 is an angular line having a slope with a rapid rate of change which cooperates with quadrant means 47. In order to prevent instant increase in speed from feed between F and G to rapid traverse between G and H, an acceleration curve 84 is located at the transitional point between these two portions. The portion between G and H on component 77 forces armature 31 downwardly and hence causes saddle 15 to move vertically upwardly at a traverse rate, while slide 17 is restrained from horizontal movement until the point of tool 73 is at point H in its path of travel. When the cutting point of tool 73 is at point H, the cutting tips of tools 74 and 75 are above the top of the workpiece 13.

The portion H to J on template component 77 is circular with its radius center on the axis of shaft 68, cooperating with quadrant means 47 and preventing vertical motion of saddle 15. The portion H to J on template component 82 provides a rapid rate of change and cooperates with quadrant means 66, permitting armature 55' to rise, hence effecting horizontal traverse of slide 17 leftwardly until the point of tool 73 is at point J. Since the portion G to H on component 81 was circular, and portion H to J on component 82 is a rapid traverse slope, an accelerating curved portion 85 is provided at the beginning of this traverse motion. This traverse motion positions tool 74 above the bore in the internal hub of workpiece 13, and locates tool 75 in position to machine the outer periphery of said hub.

The J to K portion of template component 81 is circular with its radius center on the axis of shaft 68, thereby preventing horizontal movement of tool slide 17. Accordingly, a deceleration curve 86 is provided at the end of portion H to J on component 82. The portion J to K on template component 76 is a rapidly changing sloped line. It cooperates with quadrant means 48, causing armature 31 to rise, effecting vertically downward movement of saddle 15 until the point of tool 73 is at point K in its path of travel. This locates the cutting tip of tool 75 at point K for turning the O.D. of the internal hub of the workpiece 13, and locates tool 74 over the bore of said hub with its cutting tip to the left of, and clearing the bore wall.

The portion K to L on template component 81 is circular with a radius on the axis of shaft 68, preventing horizontal movement of tool slide 17. The portion K to L on template component 76 is a relatively steeply inclined surface cooperating with quadrant means 48 to permit armature 31 to rise, effecting a relatively fast downward movement of saddle 15 until the cutting tip of tool 75 arrives at point L in its path of travel. This is possible since the surface from K to L on workpiece 13 is a non-critical surface and can be machined rapidly.

The L to M portion of template component 77 is circular, having its center on the axis of shaft 68, preventing the vertical movement of saddle 15. The L to M portion of template component 81 is a rise acting on quadrant means 65 to effect rightward movement of tool slide 17 until the tip of tool 75 is at point M.

The M to N portion of template component 81 is circular with a radius on the axis of shaft 68 so that tool slide 17 is prevented from horizontal movement. The portion M to N on template component 76 cooperates with quadrant means 48, permitting armature 31 to rise and moving saddle 15 downwardly until the tip of tool 75 reaches point N.

The portions N to O on template components 76 and 82 cooperate with quadrant means 48 and 66, respectively, to produce feed rates which combine to give the bevel N to O in the path of travel of tool 75. This places the cutting point of tool 74 at point O within the confines of the bore of the hub of workpiece 13. The portion O to P on template component 77 is circular with a radius on the axis of shaft 68, preventing vertical movement of saddle 15. The portion O to P on template component 81 has a rapid rate of change of slope and operates quadrant means 65 to effect rightward movement of tool slide 17 at traverse rate until the tip of tool 74 is at point P within the hub bore.

The portion P to Q on template component 81 is circular with its center on the axis of shaft 68, preventing horizontal movement of tool slide 17. The portion P to Q on template component 77 has a slight rate of change of slope such that it cooperates with quadrant means 47, forcing armature 31 downwardly, causing saddle 15 to move upwardly at a feed rate until it reaches point Q in its path of travel.

The Q to R portion of template component 81 is circular, having its center on the axis of shaft 68, thereby preventing horizontal movement of slide 17. The Q to R portion on template component 77 traverses saddle 15 upwardly to point R in the path of travel of tool 73.

The portion R to S of both template components 77 and 81 act on rollers 47 and 65, simultaneously forcing armature 31 and armature 55' downwardly, thereby effecting simultaneous movement of tool slide 17 rightwardly and saddle 15 upwardly until the cutting tip of tool 73 is at point A and tools 74 and 75 are in the position shown in FIG. 1.

The portion of template components 77 and 81 between S and A is circular, preventing movement of tool slide 17 or saddle 15. At this point, the cycle is completed, the driving means for template means 42 and 67 is de-energized, the finished workpiece 13 is replaced by an unmachined piece, and the cycle is repeated.

From the foregoing it is evident that critical dimensions on the workpiece are held by the quadrant means on the plates 63 and 43 acting on circular paths on the template components. Since circular paths can be precisely ground, no problem is presented in holding accurate sizes. Furthermore, the generation of curves of varying rates of slope between succeeding direction, the cycle of operations produced by them will be identical to that produced by components 76, 77; and 81, 82 of FIG. 2.

Figure 7:
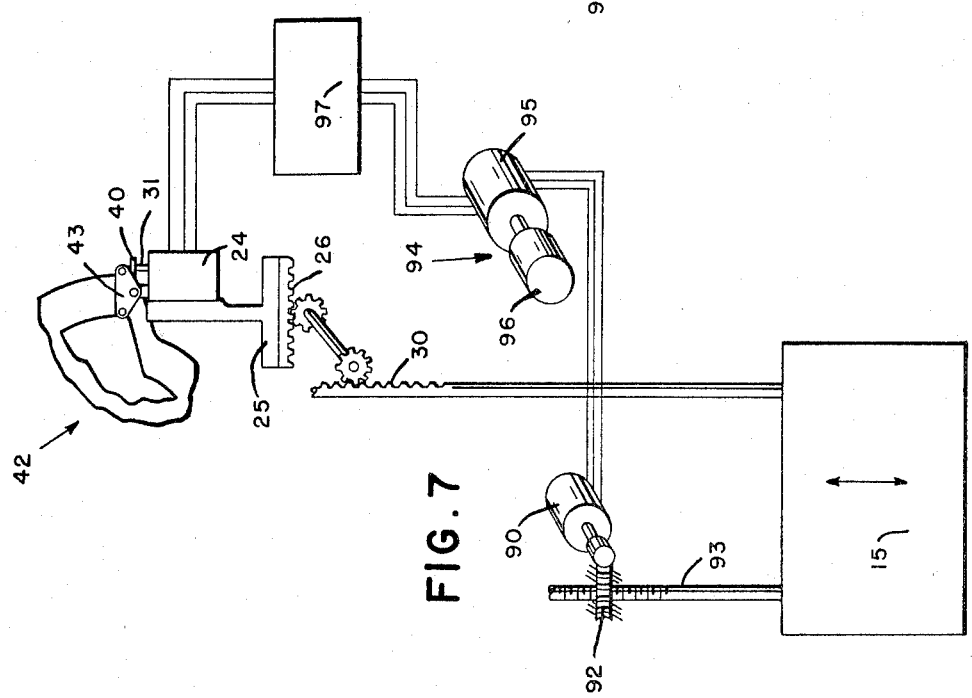

Referring to FIG. 7, the cylinder 19 and piston 20 have been replaced by a reversible direct current motor 90, to the output shaft of which a worm 91 is connected that meshes with a worm wheel 92, arranged for rotary motion but prevented from moving axially. The worm wheel 92 is threaded onto a threaded shaft 93 that in turn is fixed to saddle 15. Accordingly, rotation of worm wheel 92 in both directions raises and lowers saddle 15. The power for operating the direct current motor 90 is supplied from an amplidyne unit 94 including a generator 95 that is driven by an A.C. motor 96. The signal from E transformer 24 is amplified by amplifier 97 and its output is applied to the coils of the generator 95. An identical arrangement may also be employed for moving the slide 17. It has been omitted in FIG. 7 for clarity.

Figure 8:
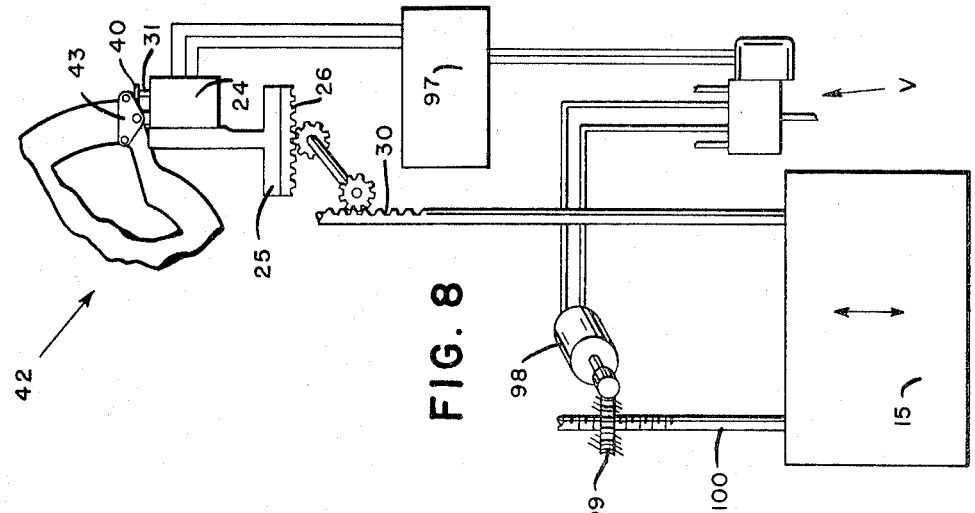
FIGS. 7 and 8 are modified forms of the invention.

Referring to FIG. 8, the cylinder 19 and piston 20 have been replaced by a rotary hydraulic motor 98 which drives a worm wheel 99 that is threaded onto a shaft 100 that is fixed to saddle 15. The hydraulic motor 98 is rotated forwardly and rearwardly by a pilot servo valve, amplifier and E transformer in the same way that pressure fluid is controllably supplied to cylinder 20 in FIG. 2.

Although the various features of the improved program control have been shown and described in detail to fully disclose several embodiments of the invention, it will be evident that changes may be made in such details and certain features may be used without others without departing from the principles of the invention.

What is claimed is:

1. Apparatus comprising in combination, a member; separate power means for moving said member along a plurality of intersecting axes in accordance with a predetermined program; separate template means for each axis of movement of said member, the coordinates of each template means being proportional to the corresponding axis coordinates of the desired path of movement of said member; separate servo means for each template means adapted to be operated by its corresponding template means for controlling the corresponding power means for said member, each servo means including electromechanical signal transducer means; feedback means responsive to the movement of said member along the axis corresponding to said servo means for controlling said servo means; and means for moving all of said template means in unison relative to said servo means, the construction and arrangement of the parts being such that the velocity of the movable member can be controlled as it is moved between any two successive points in its path of travel by the slope of the effective template surface between the corresponding template coordinates of said points.

2. Apparatus comprising in combination, a member; separate piston and cylinder means for moving said member along a plurality of intersecting axes in accordance with a predetermined program; separate template means for each axis of movement of said member, the coordinates of each template means being proportional to the corresponding axis coordinates of the desired path of movement of said member; separate servo means for each template means adapted to be operated by its corresponding template means for controlling the corresponding piston and cylinder means for said member, each servo means including electromechanical signal transducer means; feedback means responsive to the movement of said member along the axis corresponding to said servo means for controlling said servo means; and means for moving all of said template means in unison relative to said servo means; the construction and arrangement of the parts being such that the velocity of the movable member can be controlled as it is moved between any two successive points in its path of travel by the slope of the effective template surface between the corresponding template coordinates of said points.

3. Apparatus comprising in combination, a member; separate direct current motor means for moving said member along a plurality of intersecting axes in accordance with a predetermined program; separate template means for each axis of movement of said member, the coordinates of each template means being proportional to the corresponding axis coordinates of the desired path of movement of said member; separate electromechanical signal transducer means for each template means adapted to be operated by its corresponding template means; direct current generator means controlled by said transducer means for operating said direct current motor means; feedback means responsive to the movement of said member along the axis corresponding to said transducer means for controlling said transducer means; and means for moving all of said template means in unison relative to said transducer means, the construction and arrangement of the parts being such that the velocity of the movable member can be controlled as it is moved between any two successive points in its path of travel by the slope of the effective template surface between the corresponding template coordinates of said points.

4. Apparatus comprising in combination, a member; separate power means for moving said member along a plurality of intersecting axes in accordance with a predetermined program; separate rotatable template means for each axis of movement of said member, the polar coordinates of each rotatable template means being proportional to the coresponding axis rectangular coordinates of the desired path of movement of said member; separate servo means for each template means adapted to be operated by its corresponding template means for controlling the corresponding power means for said member, each servo means including electromechanical signal transducer means; feedback means responsive to the movement of said member along the axis corresponding to said servo means for controlling said servo means; and means for rotating all of said template means in unison relative to said servo means, the construction and arrangement of the parts being such that the velocity of the movable member can be controlled as it is moved between any two successive points in its path of travel by the slope of the effective surface of the template means between the corresponding polar coordinates thereof.

5. Apparatus comprising in combination, a member; separate piston and cylinder means for moving said member along a plurality of intersecting axes in accordance with a predetermined program; separate rotatable template means for each axis of movement of said member, the polar coordinates of each rotatable template means being proportional to the corresponding axis rectangular coordinates of the desired path of movement of said member; separate electromechanical signal transducer means for each template means adapted to be operated by its coresponding template means; pilot-operated servo valve means controlled by said transducer means for controlling the flow to, and exhaust from said piston and cylinder means; feedback means responsive to the movement of said member along the axis corresponding to said transducer means for controlling said transducer means; and means for rotating all of said template means in unison relative to said transducer means, the construction and arrangement of the parts being such that the velocity of the movable member can be controlled as it is moved between any two successive points in its path of travel by the slope of the effective surface of the template means between the corresponding polar coordinates thereof.

6. Apparatus comprising in combination, a member; separate power means for moving said member along a plurality of intersecting axes in accordance with a predetermined program; composite template means for each axis of movement of said member, including separate components for each direction of movement of said member along the corresponding axis, the coordinates of each composite template means being proportional to the corresponding axis coordinates of the desired path of movement of said member; separate stylus means for each component of each composite template means adapted to be operated by its corresponding composite template means for controlling the corresponding power means for said member, each servo means including electromechanical signal transducer means; feedback means responsive to the movement of said member along the axis corresponding to said servo means for controlling said servo means; and means for moving all of said template means in unison relative to said servo means, the construction and arrangement of the parts being such that the velocity of the movable member can be controlled as it is moved between any two successive points in its path of travel by the slope of the effective surface of the template means between the corresponding template coordinates.

7. Apparatus comprising in combination, a member; separate fluid-operated power means for moving said member along a plurality of intersecting axes in accordance with a predetermined program; rotatable composite template means for each axis of movement of said member, including separate components for each direction of movement of said member along the corresponding axis, the polar coordinates of each composite template means being proportional to the corresponding axis coordinates of the desired path of movement of said member; separate stylus means for each component of said composite template means adapted to be operated by its corresponding composite template means for controlling the corresponding power means for said member; a separate pilot servo valve for controlling a corresponding fluid-operated power means; separate electromechanical signal transducer means adapted to cooperate with a corresponding composite template means for controlling its corresponding pilot servo valve; feedback means responsive to the movement of said member along the axis corresponding to said transducer means for controlling said transducer means; and means for moving all of said template means in unison relative to said transducer means, the construction and arrangement of the parts being such that the velocity of the movable member can be controlled as it is moved between any two successive points in its path of travel by the slope of the effective surface of the template means between the corresponding template coordinates.

8. Apparatus comprising in combination, a member; separate piston and cylinder means for moving said member along a plurality of intersecting axes in accordance with a predetermined program; composite template means for each axis of movement of said member, including separate components for each direction of movement of said member along the corresponding axis, the coordinates of each composite template means being proportional to the corresponding axis coordinates of the desired path of movement of said member; separate stylus means for each component of each composite template means; a separate pilot servo valve for controlling a corresponding piston and cylinder means; separate electromechanical signal transducer means adapted to cooperate with a corresponding composite template means for controlling its corresponding pilot servo valve; feedback means responsive to the movement of said member along the axis corresponding to said transducer means for controlling said transducer means; and means for moving all of said template means in unison relative to said transducer means, the construction and arrangement of the parts being such that the velocity of the movable member can be controlled as it is moved between any two successive points in its path of travel by the slope of the effective surface of the template means between the corresponding template coordinates.

9. Apparatus comprising in combination, a member; separate fluid-operated rotary means for moving said member along a plurality of intersecting axes in accordance with a predetermined program; composite template means for each axis of movement of said member, including separate components for each direction of movement of said member along the corresponding axis, the coordinates of each composite template means being proportional to the corresponding axis coordinates of the desired path of movement of said member; separate stylus means for each component of each composite template means; a separate pilot servo valve for controlling a corresponding fluid-operated rotary means; separate electromechanical signal transducer means adapted to cooperate with a corresponding composite template means for controlling its corresponding pilot servo valve; feedback means responsive to the movement of said member along the axis corresponding to said transducer means for controlling said transducer means; and means for moving all of said template means in unison relative to said transducer means, the construction and arrangement of the parts being such that the velocity of the movable member can be controlled as it is moved between any two successive points in its path of travel by the slope of the effective surface of the template means between the corresponding template coordinates.

10. Apparatus comprising in combination, a member; separate power means for moving said member along a plurality of intersecting axes in accordance with a predetermined program; composite template means for each axis of movement of said member, including separate components for each direction of movement of said member along the corresponding axis, the coordinates of each composite template means being proportional to the corresponding axis coordinates of the desired path of movement of said member, each component of a composite template means being identical in contour but of different radial dimensions; separate stylus means for each component of each composite template means, said stylus means including means, which when it is effective on one of said components the other stylus means is ineffective on said other component; separate servo means for each of said composite template means adapted to be operated by its corresponding composite template means for controlling the corresponding power means for said member, each servo means including electromechanical signal transducer means; feedback means responsive to the movement of said member along the axis corresponding to said servo means for controlling said servo means; and means for moving all of said template means in unison relative to said servo means, the construction and arrangement of the parts being such that the velocity of the movable member can be controlled as it is moved between any two successive points in its path of travel by the slope of the effective surface of the template means between the corresponding template coordinates.

11. Apparatus comprising in combination, a member; separate power means for moving said member along a plurality of intersecting axes in accordance with a predetermined program; composite template means for each axis of movement of said member, including separate components for each direction of movement of said member along the corresponding axis, the coordinates of each composite template means being proportional to the corresponding axis coordinates of the desired path of movement of said member; separate stylus means for each component of each composite template means, the separate stylus means for each composite template means includes a different template engaging portion for each component thereof, whereby when a surface of one of the components of said composite template means engages the effective portion of its stylus, the corresponding surface of the other component of said composite template means does not engage the effective portion of its stylus; separate servo means for each of said composite template means adapted to be operated by its corresponding composite template means for controlling the corresponding power means for said member, each servo means including electromechanical signal transducer means; feedback means responsive to the movement of said member along the axis corresponding to said servo means for controlling said servo means; and means for moving all of said template means in unison relative to said servo means, the construction and arrangement of the parts being such that the velocity of the movable member can be controlled as it is moved between any two successive points in its path of travel by the slope of the effective surface of the template means between the corresponding template coordinates.

12. Apparatus comprising in combination, a member; separate power means for moving said member along a plurality of intersecting axes in accordance with a predetermined program; composite template means for each axis of movement of said member, including separate components for each direction of movement of said member along the corresponding axis, the coordinates of each composite template means being proportional to the corresponding axis coordinates of the desired path of movement of said member; separate stylus means for each component of each of said composite template means, said stylus means being mounted on, and spaced equally from a pivot point of a stylus carrier; an arm integral with said carrier and parallel to a line extending between said stylus means; separate servo means for each of said composite template means including electromechanical signal transducer means having an armature mounted for purely axial movement adapted to be operated by said arm; feedback means responsive to the movement of said member along the axis corresponding to said servo means for controlling said servo means; and means for moving all of said template means in unison relative to said servo means, the construction and arrangement of the parts being such that the velocity of the movable member can be controlled as it is moved between any two successive points in its path of travel by the slope of the effective surface of the template means between the corresponding template coordinates.

13. Apparatus comprising in combination, a member; separate power means for moving said member along a plurality of intersecting axes in accordance with a predetermined program; composite template means for each axis of movement of said member, including separate components for each direction of movement of said member along the corresponding axis, the coordinates of each composite template means being proportional to the corresponding axis coordinates of the desired path of movement of said member; separate stylus means for each component of each of said composite template means, the separate stylus means for components of one of the composite template means includes an effective portion covering the second quadrant, and the stylus means for the other component of said one composite template means includes an effective portion covering the third quadrant; separate servo means for each of said composite template means adapted to be operated by its corresponding composite template means for controlling the corresponding power means for said member, each servo means including electromechanical signal transducer means; feedback means responsive to the movement of said member along the axis corresponding to said servo means for controlling said servo means; and means for moving all of said template means in unison relative to said servo means, the construction and arrangement of the parts being such that the velocity of the movable member can be controlled as it is moved between any two successive points in its path of travel by the slope of the effective surface of the template means between the corresponding template coordinates.

No references cited.

LEONARD FORMAN, *Primary Examiner.*

H. N. HAROIAN, *Assistant Examiner.*